F. PERRIER.
SAD-IRON.

No. 179,051. Patented June 20, 1876.

Witnesses.
Robt E. Miller
Otto Hufeland

Inventor.
François Perrier
per
Van Santvoord & Hauff
Attorneys.

N. PETERS, PHOTO-LITHOGRAPHER, WASHINGTON, D. C.

UNITED STATES PATENT OFFICE.

FRANÇOIS PERRIER, OF NEW YORK, N. Y.

IMPROVEMENT IN SAD-IRONS.

Specification forming part of Letters Patent No. 179,051, dated June 20, 1876; application filed May 20, 1876.

*To all whom it may concern:*

Be it known that I, FRANÇOIS PERRIER, of the city, county, and State of New York, have invented a new and useful Improvement in Sad-Irons, which invention is fully set forth in the following specification, reference being had to the accompanying drawing, in which—

Figure 1:
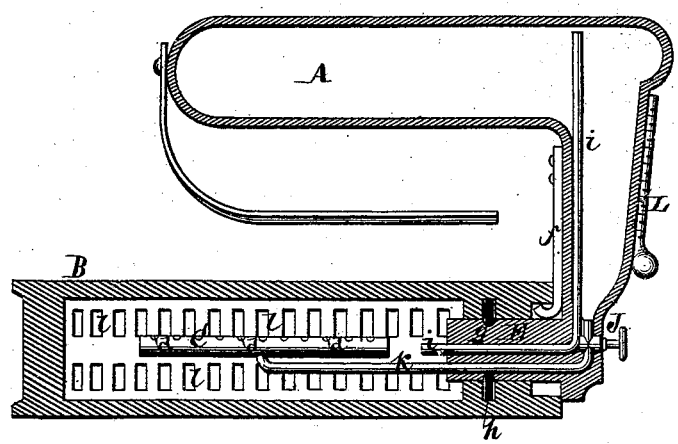
Figure 2:
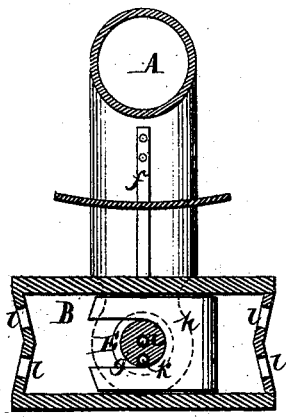

Figure 1 represents a longitudinal vertical section of my improvement. Fig. 2 is a vertical cross-section thereof.

Similar letters indicate corresponding parts in all the figures.

My improvement relates to that class of sad-irons in which the handle and the base are made hollow, the handle forming a reservoir for burning-fluid, and the base containing a burner, to which the fluid is fed from the handle. It consists in the combination of a hollow handle, a hollow base, a burner, which is connected to the hollow handle and situated within the hollow base, and a pipe for admitting air to the interior of the hollow handle, such air-pipe extending from the hollow base through and to the upper part of the hollow handle, so that it is brought above the level of the fluid in the handle, while, by means thereof, the flow of the fluid to the burner is made uniform. It consists, also, in connecting the hollow handle to one end of the hollow base, so that the other end of the base remains free, and by this means the utility of the iron is greatly increased. It consists, further, in certain novel means for connecting the hollow handle and the hollow base to each other, so as to render the base reversible and detachable from the handle.

To this end the hollow handle is provided with a stem, which is inserted in a hole formed in one end of the hollow base, and provided with a circumferential groove, which is embraced by a U-shaped catch-plate slid through a transverse groove in the base, in such a manner that by the catch-plate the base and the handle are firmly held together, while the base is capable of being turned for the purpose of reversing its position, and when the catch-plate is removed the handle and the base can be taken apart.

For the purpose of retaining the base in the proper relative position to the handle, I make use of a spring-catch or any other equivalent device, which is arranged to act on the base and prevent its displacement, except by the application of force.

In the drawing, the letter A designates the hollow handle, and B is the hollow base, of a sad-iron made according to my invention. In order that the hollow handle A may be filled with burning-fluid it is provided with a nipple at any suitable part thereof. C designates a burner, which is situated within the hollow base B, and connected to the hollow handle A by means of a pipe, K. This burner C, in the present example, has the form of a tube, which is provided with a series of holes, $d$, and adapted to contain a wick. The burning-fluid, poured in the hollow handle A, runs down to the burner C through the pipe K, and is absorbed by the wick, while, when the burner is lighted, it very effectually heats the hollow base B.

In order to cause the burning-fluid to flow from the hollow handle A in a clear or uniform stream it is essential that air be admitted to the interior of the handle above the level of the fluid therein. This object is effected by means of a pipe, $i$, which is made to communicate at one end with the interior of the hollow base B, and at the other end with the interior and upper part of the hollow handle, as seen in Fig. 1. The hollow handle A is connected to the hollow base B at one end of the base, instead of at its two ends, as in all sad-irons of this class to me hitherto known, so that one end of the base remains free, and the advantage found in thus connecting the parts together is, that the article can be used to better advantage for various purposes—as, for instance, for ironing the inside of a sleeve.

For the purpose of connecting the hollow base and hollow handle together I provide the latter with a stem, E, which is inserted in a hole formed in or through the end of the base B, as seen in Fig. 1, and on the circumference of which is formed a circular groove, $g$. This groove $g$ is embraced by a U-shaped catch-plate, $h$, (best seen in Fig. 2,) which is fitted in and slid through a groove made for its reception across and within the hollow base B, the said catch-plate $h$ being allowed to rest against the upper and lower surfaces of this groove. By the groove *g* and catch-plate *h* the hollow handle and base are firmly united together, while at the same time the base is free to be rotated, and can readily be reversed in its position. When the catch-plate *h* is removed the stem E can be withdrawn, so as to detach the handle from the base.

For the purpose of holding the hollow base B in a fixed position after it has been reversed I attach to the outer surface of the handle A a spring catch, *f*, and provide the base with notches at the proper points to receive the catch, and thereby the base is held in the proper relative position to the handle.

The stem E forms a support for the pipe K, which carries the burner C, and also for the air-pipe *i*, the pipe being packed, so that the burning-fluid is not liable to escape through the stem.

In the sides of the hollow base B are formed numerous holes or perforations, *h'*, for the escape of the products of combustion from the interior thereof.

The pipe K is provided with a stop-cock, J, for the purpose of regulating the supply of fluid to the burner C, such stop-cock being made to project from the outer end of the stem E, as shown.

Having thus described my invention, what I claim, and desire to secure by Letters Patent, is—

1. The combination, in a sad-iron, of a hollow handle, A, forming a reservoir for burning-fluid, a hollow base, B, a burner, C, which is connected to the hollow handle and situated within the hollow base, and a pipe, *i*, for admitting air to the interior of the hollow handle, the whole constructed and arranged substantially as described.

2. In combination with the hollow base B, the hollow handle A, forming a reservoir for burning-fluid, and the burner C, the grooved stem E, and U-shaped catch-plate *h*, and spring-catch *f*, or equivalent device, the whole constructed and arranged substantially as described.

In testimony that I claim the foregoing I have hereunto set my hand and seal this 12th day of May, 1876.

FRANÇOIS PERRIER. [L. S.]

Witnesses:
W. HAUFF,
E. F. KASTENHUBER.